US012574643B2

(12) United States Patent

Nikhara

(10) Patent No.: US 12,574,643 B2

(45) Date of Patent: Mar. 10, 2026

(54) PRECISE FIELD-OF-VIEW TRANSITIONS WITH AUTOFOCUS FOR VARIABLE OPTICAL ZOOM SYSTEMS

(71) Applicant: QUALCOMM Incorporated, San Diego, CA (US)

(72) Inventor: Soman Ganesh Nikhara, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 18/495,463

(22) Filed: Oct. 26, 2023

(65) Prior Publication Data

US 2025/0142215 A1    May 1, 2025

(51) Int. Cl.
H04N 23/69 (2023.01)
G02B 7/09 (2021.01)
H04N 23/55 (2023.01)

(52) U.S. Cl.
CPC ............... H04N 23/69 (2023.01); G02B 7/09 (2013.01); H04N 23/55 (2023.01)

(58) Field of Classification Search
CPC . H04N 23/69; G02B 7/09; G02B 7/10; G02B 7/102; G03B 2205/0046
USPC ...................................................... 348/240.99
See application file for complete search history.

(56) References Cited

U.S. PATENT DOCUMENTS

| | | | | | |
|---|---|---|---|---|---|
| 6,134,390 | A | * | 10/2000 | Kasuya | G02B 7/102 |
| | | | | | 359/698 |
| 10,051,201 | B1 | * | 8/2018 | Wang | G02B 13/02 |
| 2007/0120988 | A1 | * | 5/2007 | Akiyama | H04N 5/2628 |
| | | | | | 348/240.99 |
| 2007/0172221 | A1 | * | 7/2007 | Moriya | G02B 7/102 |
| | | | | | 348/E5.045 |

FOREIGN PATENT DOCUMENTS

JP        2000009987  A  *  1/2000

* cited by examiner

*Primary Examiner* — Anthony J Daniels
(74) *Attorney, Agent, or Firm* — QUALCOMM Incorporated

(57) ABSTRACT

This disclosure provides systems, methods, and devices for image signal processing that support precise zoom level transitions. In a first aspect, a method of image processing includes receiving a zoom command to transition from a first zoom level to a second zoom level for a variable optical zoom (VOZ) system; determining a first arrangement of a lens module of the VOZ system based on the second zoom level and an autofocus arrangement of the lens module; determining a second arrangement of the lens module based on the first arrangement; and controlling the VOZ system to adjust the lens module to a third arrangement associated with the second zoom level based on the second arrangement and the autofocus arrangement of the lens module. Other aspects and features are also claimed and described.

30 Claims, 5 Drawing Sheets

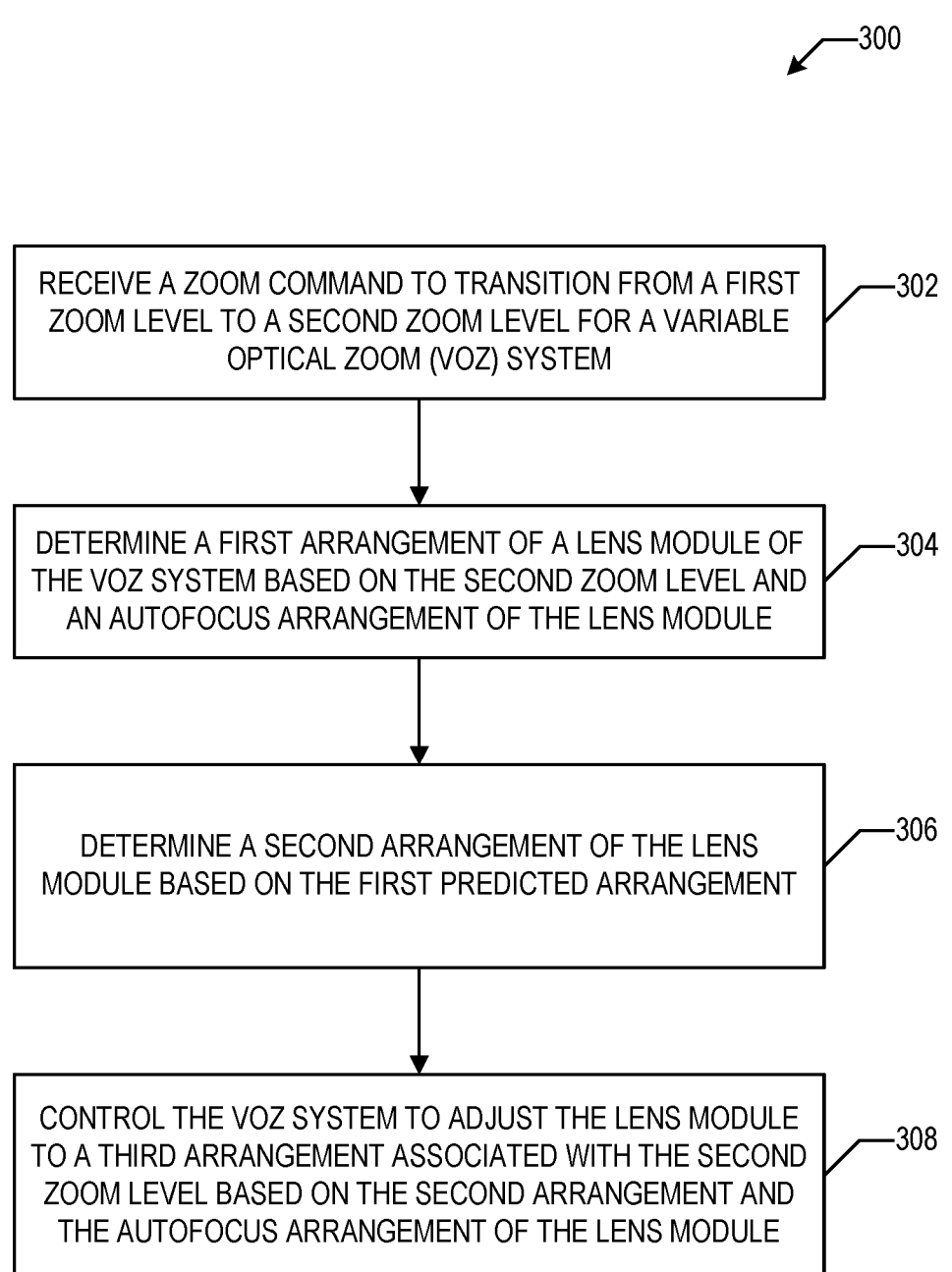

—300

RECEIVE A ZOOM COMMAND TO TRANSITION FROM A FIRST ZOOM LEVEL TO A SECOND ZOOM LEVEL FOR A VARIABLE OPTICAL ZOOM (VOZ) SYSTEM ——302

DETERMINE A FIRST ARRANGEMENT OF A LENS MODULE OF THE VOZ SYSTEM BASED ON THE SECOND ZOOM LEVEL AND AN AUTOFOCUS ARRANGEMENT OF THE LENS MODULE ——304

DETERMINE A SECOND ARRANGEMENT OF THE LENS MODULE BASED ON THE FIRST PREDICTED ARRANGEMENT ——306

CONTROL THE VOZ SYSTEM TO ADJUST THE LENS MODULE TO A THIRD ARRANGEMENT ASSOCIATED WITH THE SECOND ZOOM LEVEL BASED ON THE SECOND ARRANGEMENT AND THE AUTOFOCUS ARRANGEMENT OF THE LENS MODULE ——308

*FIG. 3*

PRECISE FIELD-OF-VIEW TRANSITIONS WITH AUTOFOCUS FOR VARIABLE OPTICAL ZOOM SYSTEMS

TECHNICAL FIELD

Aspects of the present disclosure relate generally to image processing, and more particularly, to improved field-of-view transitions with autofocus for variable optical zoom (VOZ) systems. Some features may enable and provide improved image processing, including control of optical and digital zoom levels applied during zoom level transitions with autofocus for VOZ systems.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Techniques are provided that enable precise zoom level transitions for VOZ systems by taking autofocus into account. In certain VOZ systems, when a user adjusts a zoom level to be used for image capture by a camera, one or more lenses of the VOZ system can move relative to an image sensor of the VOZ system to obtain the desired zoom level. When autofocus triggers, however, such as by automatically focusing on an object near to the camera, the autofocus adds an additional zoom to the zoom level obtained by the VOZ system. As such, the realized zoom level is greater than the zoom level that the user indicated, which therefore results in a reduced field-of-view. For example, the user may have indicated a 3× zoom level, but the autofocus results in a 3.1× zoom level. The present techniques calibrate the zoom level that the VOZ system obtains in response to a zoom level adjustment by predicting a zoom amount that autofocus will add and determining how the VOZ system's lens module needs to be arranged to compensate for the autofocus-added zoom so that the realized zoom level is equal to the zoom level that the user indicates. In this way, a precise zoom level transition is achieved, which improves the user experience by providing the user with improved zoom level control. Additionally, exposure and white balance will be stable with the precise zoom level transition, since the field-of-view of the VOZ image sensor will not change for different focus positions, which improves image quality and the smoothness of zoom level transitions.

The precise zoom level transitions for VOZ systems may include zoom level transitions that increase the zoom level or that decrease the zoom level, and thus improve the user experience for both transition directions. In some aspects, the present techniques involve utilizing an image captured by an image sensor (e.g., wide-angle image sensor) separate from the VOZ system when the VOZ system is physically incapable of compensating for the zoom added by autofocus. In such aspects, the image captured by the image sensor is fused with an image captured by the VOZ image sensor, which improves the user experience by enabling precise zoom level transitions for the entire range of the VOZ system's available zoom levels.

In one aspect of the disclosure, a method for image processing includes receiving a zoom command to transition from a first zoom level to a second zoom level for a variable optical zoom (VOZ) system; determining a first arrangement of a lens module of the VOZ system based on the second zoom level and an autofocus arrangement of the lens module; determining a second arrangement of the lens module based on the first arrangement; and controlling the VOZ system to adjust the lens module to a third arrangement associated with the second zoom level based on the second arrangement and the autofocus arrangement of the lens module.

In an additional aspect of the disclosure, an apparatus includes at least one processor and a memory coupled to the at least one processor. The at least one processor is configured to perform operations including receiving a zoom command to transition from a first zoom level to a second zoom level for a variable optical zoom (VOZ) system; determining a first arrangement of a lens module of the VOZ system based on the second zoom level and an autofocus arrangement of the lens module; determining a second arrangement of the lens module based on the first arrangement; and controlling the VOZ system to adjust the lens module to a third arrangement associated with the second zoom level based on the second arrangement and the autofocus arrangement of the lens module.

In an additional aspect of the disclosure, a non-transitory computer-readable medium stores instructions that, when executed by a processor, cause the processor to perform operations. The operations include receiving a zoom command to transition from a first zoom level to a second zoom level for a variable optical zoom (VOZ) system; determining a first arrangement of a lens module of the VOZ system based on the second zoom level and an autofocus arrangement of the lens module; determining a second arrangement of the lens module based on the first arrangement; and controlling the VOZ system to adjust the lens module to a third arrangement associated with the second zoom level based on the second arrangement and the autofocus arrangement of the lens module.

In an additional aspect of the disclosure, an image capture device includes a lens module; a memory storing processor-readable code; and at least one processor coupled to the memory and to the image sensor, the at least one processor configured to execute the processor-readable code to cause the at least one processor to perform operations. The operations include receiving a zoom command to transition from a first zoom level to a second zoom level for the VOZ system; determining a first arrangement of the lens module of the VOZ system based on the second zoom level and an autofocus arrangement of the lens module; determining a second arrangement of the lens module based on the first arrangement; and controlling the VOZ system to adjust the lens module to a third arrangement associated with the second zoom level based on the second arrangement and the autofocus arrangement of the lens module.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various aspects herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3 A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multiframe noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some aspects, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a flow chart of an example method that takes autofocus into account for precise zoom control of a VOZ system, according to some aspects of the disclosure.

Like reference numbers and designations in the various drawings indicate like elements.

DETAILED DESCRIPTION

Figure 1A:
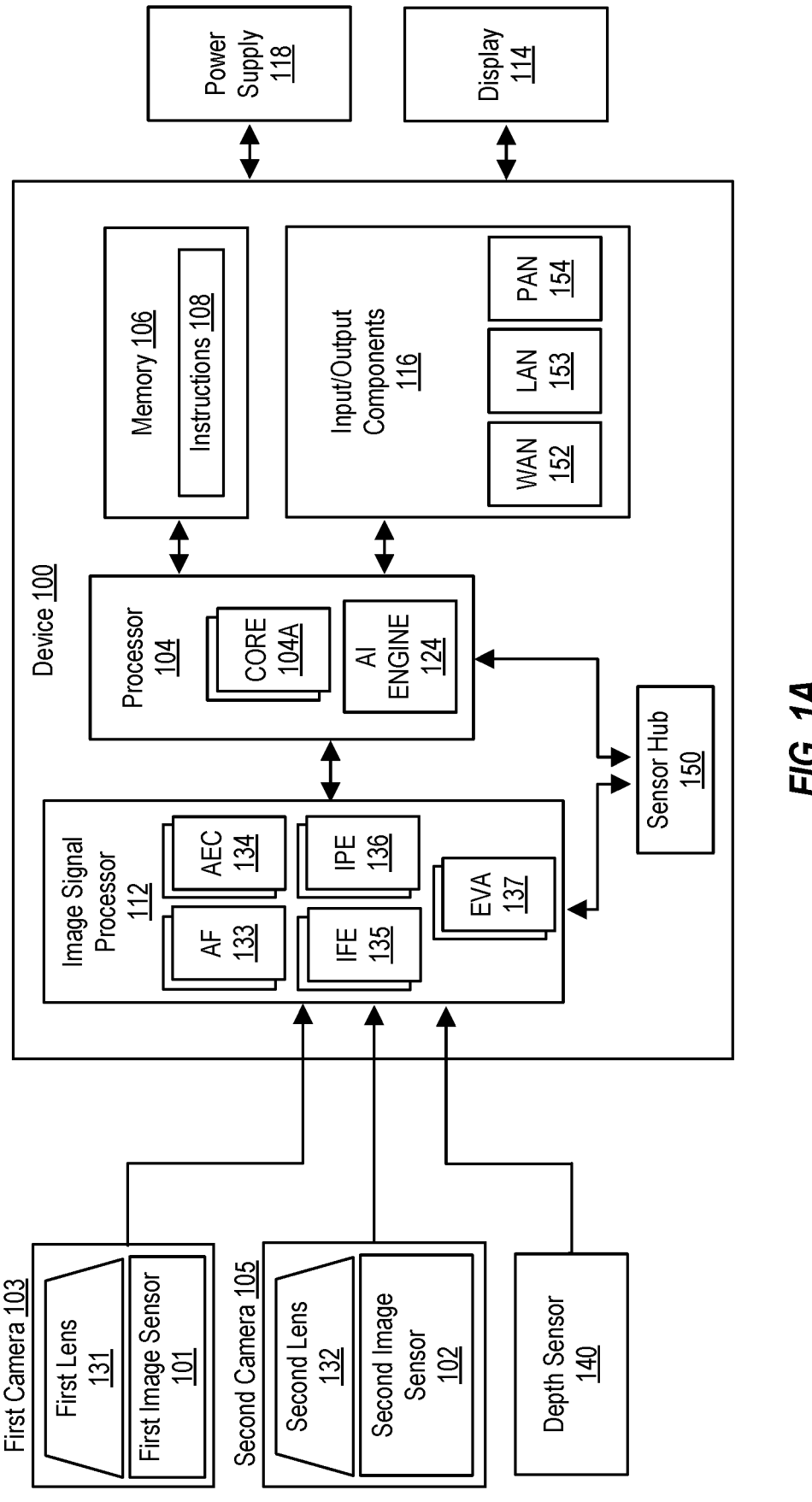
FIG. 1A is a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing, including techniques for improved zoom control for variable optical zoom (VOZ) systems. In particular, VOZ systems may be capable of transitioning to desired zoom levels within a range of possible zoom levels. When autofocus triggers, however, such as by automatically focusing on an object near to the camera, the autofocus adds an additional zoom to the zoom level obtained by the VOZ system. As such, the realized zoom level is greater than the zoom level that the user indicated, which reduces the user's desired field-of-view for the image to be captured. The present techniques calibrate the zoom level that the VOZ system obtains in response to a zoom level adjustment by predicting a zoom amount that autofocus will add and determining how the VOZ system's lens module needs to be arranged to compensate for the autofocus-added zoom so that the realized zoom level is equal to the zoom level that the user indicates.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

Particular implementations of the subject matter described in this disclosure may be implemented to realize one or more of the following potential advantages or benefits. In some aspects, the present disclosure provides techniques for an improved user experience by providing the user with improved zoom level control for precise zoom level transitions to a zoom level that the user indicates. In some aspects, the techniques improve the user experience by allowing the user to transition through the COZ system's full possible range of zoom levels. In some aspects, the techniques improve the user experience and image quality by maintaining a constant field-of-view of the VOZ image sensor through the precise zoom level transitions to different focus positions, which enables stable exposure and white balance as well as smooth zoom level transitions. In some aspects, by maintaining a constant field-of-view of the VOZ image sensor for different focus planes, the techniques may be utilized to simplify and improve the accuracy of focus bracketing.

In the description of aspects herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for capturing image frames using one or more image sensors, such as a smartphone, may include a configuration of one, two, three, four, or more camera modules on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames (such as through a bus) in a memory and/or provide the output image frames to processing circuitry (such as an applications processor). The processing circuitry may perform further processing, such as for encoding, storage, transmission, or other manipulation of the output image frames.

As used herein, a camera module may include the image sensor and certain other components coupled to the image sensor used to obtain a representation of a scene in image data comprising an image frame. For example, a camera module may include other components of a camera, including a shutter, buffer, or other readout circuitry for accessing individual pixels of an image sensor. In some aspects, the camera module may include one or more components including the image sensor included in a single package with an interface configured to couple the camera module to an image signal processor or other processor through a bus.

FIG. 1 shows a block diagram of a device 100 for performing image capture from one or more image sensors. The device 100 may include, or otherwise be coupled to, an image signal processor (e.g., ISP 112) for processing image frames from one or more image sensors, such as a first image sensor 101, a second image sensor 102, and a depth sensor 140. In some implementations, the device 100 also includes or is coupled to a processor 104 and a memory 106 storing instructions 108 (e.g., a memory storing processor-readable code or a non-transitory computer-readable medium storing instructions). The device 100 may also include or be coupled to a display 114 and components 116. Components 116 may be used for interacting with a user, such as a touch screen interface and/or physical buttons.

Components 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna, including multiple antennas configured for primary and diversity reception and/or configured for receiving specific frequency bands. In some aspects, antennas may be shared for communicating on different networks by the WAN adaptor 152, LAN adaptor 153, and/or PAN adaptor 154. In some aspects, the WAN adaptor 152, LAN adaptor 153, and/or PAN adaptor 154 may share circuitry and/or be packaged together, such as when the LAN adaptor 153 and the PAN adaptor 154 are packaged as a single integrated circuit (IC).

The device 100 may further include or be coupled to a power supply 118 for the device 100, such as a battery or an adaptor to couple the device 100 to an energy source. The device 100 may also include or be coupled to additional features or components that are not shown in FIG. 1. In one example, a wireless interface, which may include a number of transceivers and a baseband processor in a radio frequency front end (RFFE), may be coupled to or included in WAN adaptor 152 for a wireless communication device. In a further example, an analog front end (AFE) to convert analog image data to digital image data may be coupled between the first image sensor 101 or second image sensor 102 and processing circuitry in the device 100. In some aspects, AFEs may be embedded in the ISP 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, which is a device configured for measuring rotation, orientation, and/or angular velocity to generate motion data. Another example non-camera sensor is an accelerometer, which is a device configured for measuring acceleration, which may also be used to determine velocity and distance traveled by appropriately integrating the measured acceleration. In some aspects, a gyroscope in an electronic image stabilization system (EIS) may be coupled to the sensor hub. In another example, a non-camera sensor may be a global positioning system (GPS) receiver, which is a device for processing satellite signals, such as through triangulation and other techniques, to determine a location of the device 100. The location may be tracked over time to determine additional motion information, such as velocity and acceleration. The data from one or more sensors may be accumulated as motion data by the sensor hub 150. One or more of the acceleration, velocity, and/or distance may be included in motion data provided by the sensor hub 150 to other components of the device 100, including the ISP 112 and/or the processor 104.

The ISP 112 may receive captured image data. In one embodiment, a local bus connection couples the ISP 112 to the first image sensor 101 and second image sensor 102 of a first camera 103 and second camera 105, respectively. In another embodiment, a wire interface couples the ISP 112 to an external image sensor. In a further embodiment, a wireless interface couples the ISP 112 to the first image sensor 101 or second image sensor 102.

The first image sensor 101 and the second image sensor 102 are configured to capture image data representing a scene in the field of view of the first camera 103 and second camera 105, respectively. In some aspects, the first camera 103 and/or second camera 105 output analog data, which is converted by an analog front end (AFE) and/or an analog-to-digital converter (ADC) in the device 100 or embedded in the ISP 112. In some aspects, the first camera 103 and/or second camera 105 output digital data. The digital image data may be formatted as one or more image frames, whether received from the first camera 103 and/or second camera 105 or converted from analog data received from the first camera 103 and/or second camera 105.

The first camera 103 may include the first image sensor 101 and a first lens 131. The second camera may include the second image sensor 102 and a second lens 132. Each of the first lens 131 and the second lens 132 may be controlled by an associated an autofocus (AF) algorithm (e.g., AF 133) executing in the ISP 112, which adjusts the first lens 131 and the second lens 132 to focus on a particular focal plane located at a certain scene depth. The AF 133 may be assisted by depth data received from depth sensor 140. The first lens 131 and the second lens 132 focus light at the first image sensor 101 and second image sensor 102, respectively, through one or more apertures for receiving light, one or more shutters for blocking light when outside an exposure window, and/or one or more color filter arrays (CFAs) for filtering light outside of specific frequency ranges. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

Each of the first camera 103 and second camera 105 may be configured through hardware configuration and/or software settings to obtain different, but overlapping, field of views. In some configurations, the cameras are configured with different lenses with different magnification ratios that result in different fields of view for capturing different representations of the scene. The cameras may be configured such that a UW camera has a larger FOV than a W camera, which has a larger FOV than a T camera, which has a larger FOV than a UT camera. For example, a camera configured for wide FOV may capture fields of view in the range of 64-84 degrees, a camera configured for ultra-side FOV may capture fields of view in the range of 100-140 degrees, a camera configured for tele FOV may capture fields of view in the range of 10-30 degrees, and a camera configured for ultra-tele FOV may capture fields of view in the range of 1-8 degrees.

In some aspects, one or more of the first camera 103 and/or second camera 105 may be a variable aperture (VA) camera in which the aperture can be adjusted to set a particular aperture size. Example aperture sizes include f/2.0, f/2.8, f/3.2, f/8.0, etc. Larger aperture values correspond to smaller aperture sizes, and smaller aperture values correspond to larger aperture sizes. A variable aperture (VA) camera may have different characteristics that produced different representations of a scene based on a current aperture size. For example, a VA camera may capture image data with a depth of focus (DOF) corresponding to a current aperture size set for the VA camera.

Figure 1B:
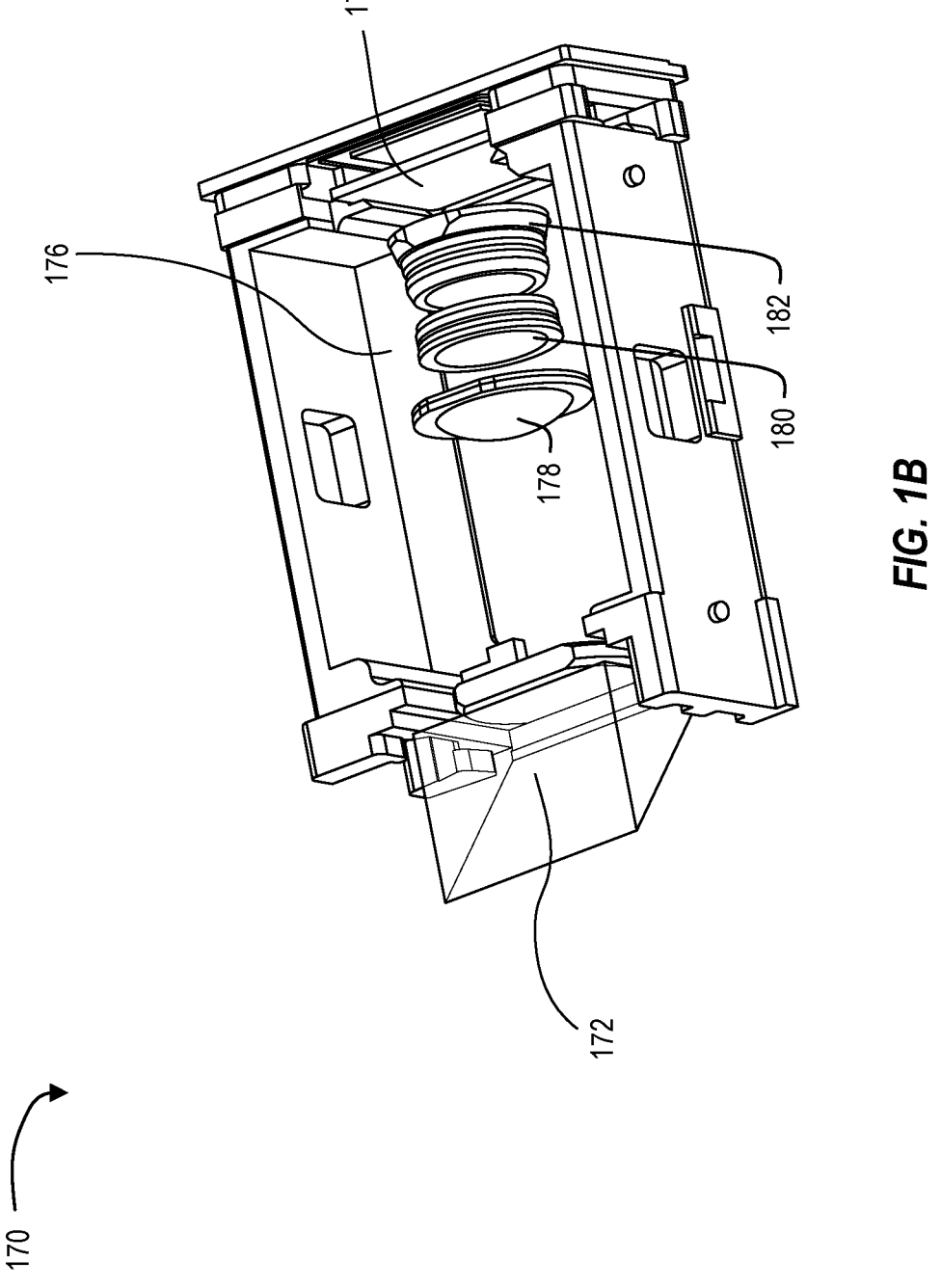
FIG. 1B is a perspective view of a variable optical zoom (VOZ) system, according to one or more aspects of the disclosure.

In some aspects, one or more of the first camera 103 and/or the second camera 105 may include a variable optical zoom (VOZ) system. VOZ systems may be capable of adjusting the focal length for one or more lenses associated with one or more image sensors in order to adjust a level of zoom for images captured by the image sensors. For example, FIG. 1B depicts a VOZ system 170 according to one aspect of the present disclosure. The VOZ system 170 includes an image sensor 174 that may receive light in order to capture images, as discussed above. In particular, the image sensor 174 may receive light that passes through a folded optical system formed from a prism 172 and a lens module 176. The lens module 176 includes a plurality of lenses 178, 180, 182 (only a subset of which are numbered for clarity). The lenses 178, 180, 182 may include one or more convex lenses, concave lenses, or combinations thereof. The prism 172 may bend the light (such as by) 90° so that the light passes through the lens module 176 and is received by the image sensor 174. In certain implementations, the prism 172 may be movable or otherwise adjustable in order to compensate for movement of the device. For example, the prism 172 may be capable of providing optical image stabilization by moving or being moved to compensate for movement of the device 100. To provide variable optical zoom settings, the lens module 176 may be movable between the image sensor 174 and the prism 172. For example, the lens module 176 may move axially along an axis connecting the prism 172 to the image sensor 174 (such as an axis extending along the center of the lenses 178, 180, 182 in FIG. 1B). Movement of the lens module 176 may enable different levels of zoom of images captured by the image sensor 174. For example, the VOZ system 170 may be capable of zoom levels (such as optical zoom levels) ranging between 1-4×, 2-5×, 1-10×, and the like. In various implementations, one or more of the lenses 178, 180, 182 may be movable relative to one another (such as to adjust depth of field, focus, or other characteristics of captured images). Reference is made herein to an arrangement of lens module 176. As used herein, an arrangement of lens module 176 refers to an axial position of lens module 176 between image sensor 174 and prism 172 as well as axial positions of each of the plurality of lenses 178, 180, 182 between image sensor 174 and prism 172. For instance, various zoom levels (and corresponding fields of view) may be achieved based on the lens module 176 position and on the relative positions of the plurality of lenses 178, 180, 182. In certain implementations, the VOZ system 170 may also be known as a continuous optical zoom (COZ) system.

The ISP 112 processes image frames captured by the first camera 103 and second camera 105. While FIG. 1 illustrates the device 100 as including first camera 103 and second camera 105, any number (e.g., one, two, three, four, five, six, etc.) of cameras may be coupled to the ISP 112. In some aspects, depth sensors such as depth sensor 140 may be coupled to the ISP 112. Output from the depth sensor 140 may be processed in a similar manner to that of first camera 103 and second camera 105. Examples of depth sensor 140 include active sensors, including one or more of indirect Time of Flight (iToF), direct Time of Flight (dToF), light detection and ranging (Lidar), mm Wave, radio detection and ranging (Radar), and/or hybrid depth sensors, such as structured light sensors. In aspects without a depth sensor 140, similar information regarding depth of objects or a depth map may be determined from the disparity between first camera 103 and second camera 105, such as by using a depth-from-disparity algorithm, a depth-from-stereo algorithm, phase detection auto-focus (PDAF) sensors, or the like. In addition, any number of additional image sensors or image signal processors may exist for the device 100.

In some aspects, the ISP 112 may execute instructions from a memory, such as instructions 108 from the memory 106, instructions stored in a separate memory coupled to or included in the ISP 112, or instructions provided by the processor 104. In addition, or in the alternative, the ISP 112 may include specific hardware (such as one or more integrated circuits (ICs)) configured to perform one or more operations described in the present disclosure. For example, the ISP 112 may include image front ends (e.g., IFE 135), image post-processing engines (e.g., IPE 136), auto exposure compensation (AEC) engines (e.g., AEC 134), and/or one or more engines for video analytics (e.g., EVA 137). An image pipeline may be formed by a sequence of one or more of the IFE 135, IPE 136, and/or EVA 137. In some aspects, the image pipeline may be reconfigurable in the ISP 112 by changing connections between the IFE 135, IPE 136, and/or EVA 137. The AF 133, AEC 134, IFE 135, IPE 136, and EVA 137 may each include application-specific circuitry, be embodied as software or firmware executed by the ISP 112, and/or a combination of hardware and software or firmware executing on the ISP 112.

The memory 106 may include a non-transient or non-transitory computer readable medium storing computer-executable instructions as instructions 108 to perform all or a portion of one or more operations described in this disclosure. The instructions 108 may include a camera application (or other suitable application such as a messaging application) to be executed by the device 100 for photography or videography. The instructions 108 may also include other applications or programs executed by the device 100, such as an operating system and applications other than for image or video generation. Execution of the camera application, such as by the processor 104, may cause the device 100 to record images using the first camera 103 and/or second camera 105 and the ISP 112.

In addition to instructions 108, the memory 106 may also store image frames. The image frames may be output image frames stored by the ISP 112. The output image frames may be accessed by the processor 104 for further operations. In some aspects, the device 100 does not include the memory 106. For example, the device 100 may be a circuit including the ISP 112, and the memory may be outside the device 100. The device 100 may be coupled to an external memory and configured to access the memory for writing output image frames for display or long-term storage. In some aspects, the device 100 is a system-on-chip (SoC) that incorporates the ISP 112, the processor 104, the sensor hub 150, the memory 106, and/or components 116 into a single package.

In some aspects, at least one of the ISP 112 or the processor 104 executes instructions to perform various operations described herein, including calibrating a VOZ system's zoom level to account for autofocus-contributed zoom. For example, execution of the instructions can instruct the ISP 112 to begin or end capturing an image frame or a sequence of image frames, in which the capture includes correction as described in aspects herein. In some aspects, the processor 104 may include one or more general-purpose processor cores 104A-N capable of executing instructions to control operation of the ISP 112. For example, the cores 104A-N may execute a camera application (or other suitable application for generating images or video) stored in the memory 106 that activate or deactivate the ISP 112 for capturing image frames and/or control the ISP 112 in the application of calibrating a VOZ system's zoom level to account for autofocus-contributed zoom as part of capturing the image frames. The operations of the cores 104A-N and ISP 112 may be based on user input. For example, a camera application executing on processor 104 may receive a user command to begin a video preview display upon which a video comprising a sequence of image frames is captured and processed from first camera 103 and/or the second camera 105 through the ISP 112 for display and/or storage. Image processing to determine "output" or "corrected" image frames, such as according to techniques described herein, may be applied to one or more image frames in the sequence.

In some aspects, the processor 104 may include ICs or other hardware (e.g., an artificial intelligence (AI) engine such as AI engine 124 or other co-processor) to offload certain tasks from the cores 104A-N. The AI engine 124 may be used to offload tasks related to, for example, face detection and/or object recognition performed using machine learning (ML) or artificial intelligence (AI). The AI engine 124 may be referred to as an Artificial Intelligence Processing Unit (AI PU). The AI engine 124 may include hardware configured to perform and accelerate convolution operations involved in executing machine learning algorithms, such as by executing predictive models such as artificial neural networks (ANNs) (including multilayer feedforward neural networks (MLFFNN), the recurrent neural networks (RNN), and/or the radial basis functions (RBF)). The ANN executed by the AI engine 124 may access predefined training weights for performing operations on user data. The ANN may alternatively be trained during operation of the image capture device 100, such as through reinforcement training, supervised training, and/or unsupervised training. In some other aspects, the device 100 does not include the processor 104, such as when all of the described functionality is configured in the ISP 112.

In some aspects, the display 114 may include one or more suitable displays or screens allowing for user interaction and/or to present items to the user, such as a preview of the output of the first camera 103 and/or second camera 105. In some aspects, the display 114 is a touch-sensitive display. The input/output (I/O) components, such as components 116, may be or include any suitable mechanism, interface, or device to receive input (such as commands) from the user and to provide output to the user through the display 114. For example, the components 116 may include (but are not limited to) a graphical user interface (GUI), a keyboard, a mouse, a microphone, speakers, a squeezable bezel, one or more buttons (such as a power button), a slider, a toggle, or a switch.

While shown to be coupled to each other via the processor 104, components (such as the processor 104, the memory 106, the ISP 112, the display 114, and the components 116) may be coupled to each another in other various arrangements, such as via one or more local buses, which are not shown for simplicity. One example of a bus for interconnecting the components is a peripheral component interface (PCI) express (PCIe) bus.

While the ISP 112 is illustrated as separate from the processor 104, the ISP 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated with an improved user experience to obtain improved images by calibrating a VOZ system's zoom level to account for autofocus-contributed zoom. One example method of operating one or more cameras, such as first camera 103 and/or second camera 105, is shown in FIG. 2 and described below.

Figure 2:
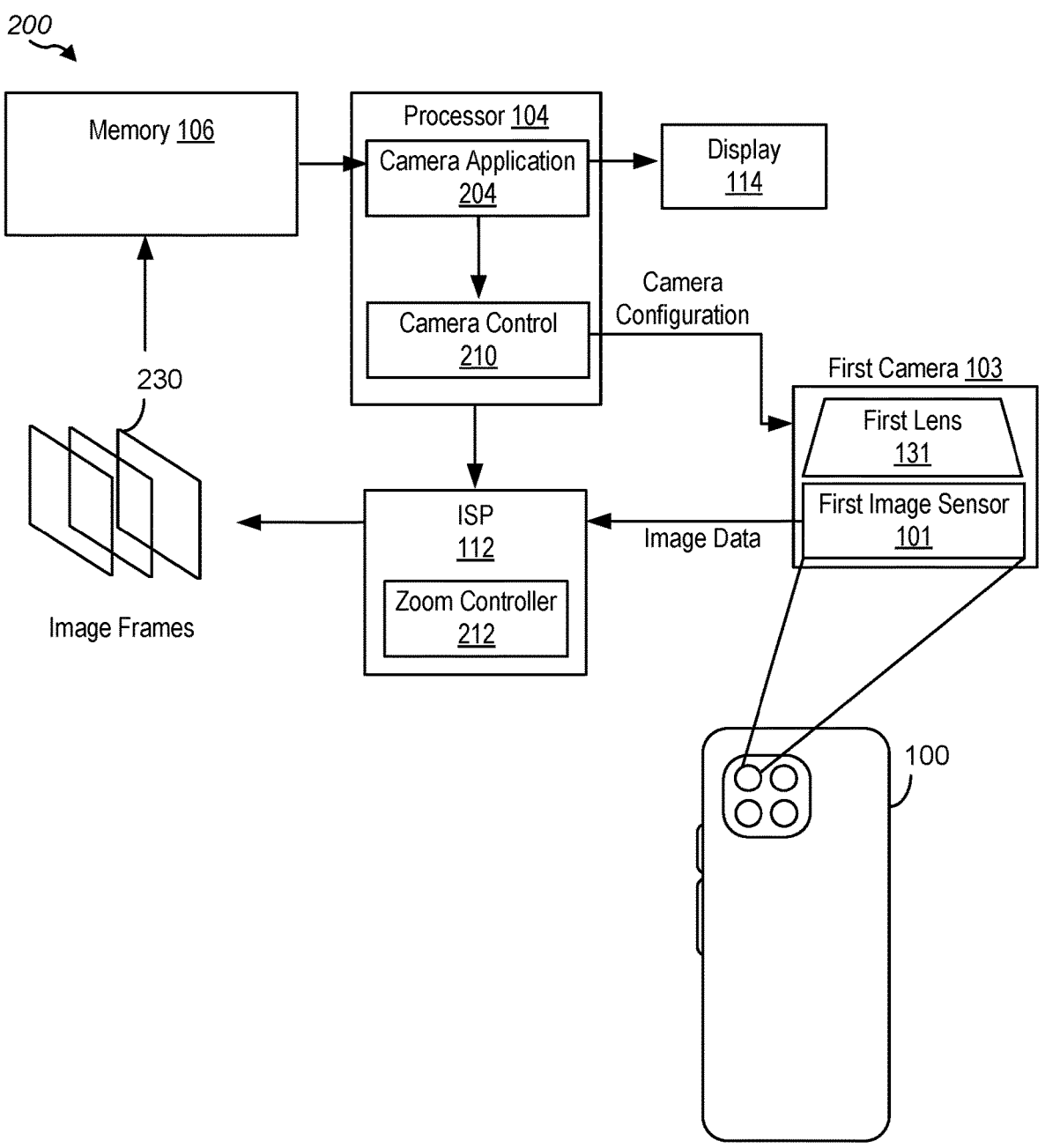
FIG. 2 is a block diagram illustrating an example data flow path for image data processing in an image capture device, according to one or more aspects of the disclosure.

FIG. 2 is a block diagram illustrating an example data flow path for image data processing in an image capture device according to one or more aspects of the disclosures. Processor 104 of system 200 may communicate with ISP 112 through a bi-directional bus and/or separate control and data lines. The processor 104 may control the first camera 103 through camera control 210. The camera control 210 may be a camera driver executed by the processor 104 for configuring the first camera 103, such as to active or deactivate image capture, configure exposure settings, and/or configure aperture size. Camera control 210 may be managed by a camera application 204 executing on the processor 104. The camera application 204 provides settings accessible to a user such that a user can specify individual camera settings or select a profile with corresponding camera settings. Camera control 210 communicates with the first camera 103 to configure the first camera 103 in accordance with commands received from the camera application 204. The camera application 204 may be, for example, a photography application, a document scanning application, a messaging application, or other application that processes image data acquired from the first camera 103.

The camera configuration may include parameters that specify, for example, a frame rate, an image resolution, a readout duration, an exposure level, an aspect ratio, an aperture size, etc. The first camera 103 may apply the camera configuration and obtain image data representing a scene using the camera configuration. In some aspects, the camera configuration may be adjusted to obtain different representations of the scene. For example, the processor 104 may execute a camera application 204 to instruct the first camera 103, through camera control 210, to set a first camera configuration for the first camera 103, to obtain first image data from the first camera 103 operating in the first camera configuration, to instruct the first camera 103 to set a second camera configuration for the first camera 103, and to obtain second image data from the first camera 103 operating in the second camera configuration.

In some aspects in which the first camera 103 is a variable aperture (VA) camera system, the processor 104 may execute a camera application 204 to instruct the first camera 103 to configure to a first aperture size, obtain first image data from the first camera 103, instruct the first camera 103 to configure to a second aperture size, and obtain second image data from the first camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 corresponds to a larger aperture size than f/8.0.

The image data received from the first camera 103 may be processed in one or more blocks of the ISP 112 to determine output image frames 230 that may be stored in memory 106 and/or otherwise provided to the processor 104. The processor 104 may further process the image data to apply effects to the output image frames 230. Effects may include Bokeh, lighting, color casting, and/or high dynamic range (HDR) merging. In some aspects, the effects may be applied in the ISP 112.

The output image frames 230 by the ISP 112 may include representations of the scene improved by aspects of this disclosure, such that output image frames 230 are captured precisely at a user-indicated zoom level. The processor 104 may display these output image frames 230 to a user, and the improvements provided by the described processing implemented in the ISP 112 and/or processor 104 improve the user experience by improving the accuracy of the zoom level of output image frames 230 relative to the zoom level indicated by the user. For example, zoom controller 212 in the ISP 112 may calibrate a position of lens module 176 of the first camera 103 when determining the output image frames 230.

The system 200 of FIG. 2 may be configured to perform the operations described with reference to FIG. 3 to determine output image frames 230. FIG. 3 shows a flow chart of an example method that takes autofocus into account for precise zoom control of a VOZ system according to some aspects of the disclosure. The controlling in FIG. 3 may improve the user experience and obtain an improved digital representation of a scene, which results in a photograph or video with higher image quality (IQ). Each of the operations described with reference to FIG. 3 may be performed by one or a combination of the processor 104 (including cores 104A-N or AI engine 124) and/or the ISP 112.

At block 302, a zoom command is received to transition from a first zoom level to a second zoom level for a VOZ system, such as while the VOZ system is configured with the camera configuration. In some aspects, the zoom command may be initiated by a camera application executing on the processor 104, which causes camera control 210 to adjust lens module 176 of VOZ system 170. The zoom command received at block 302 may be processed by the ISP 112 and/or processor 104 or other means for controlling a VOZ system according to the operations described in one or more of the following blocks. In some aspects, the first zoom level is greater than the second zoom level (e.g., the user is zooming out). In other aspects, the second zoom level is greater than the first zoom level (e.g., the user is zooming in).

At block 304, a first arrangement of lens module 176 of VOZ system 170 is determined based on the second zoom level and an autofocus arrangement of the lens module. The first arrangement of lens module 176 may be associated with a third zoom level that is greater than the second zoom level. For instance, an autofocus operation may adjust an arrangement of lens module 176 to focus on a particular portion of a scene, which may add zoom to the second zoom level and would thereby reduce a field-of-view of the scene. The autofocus arrangement of the lens module may be determined according to any suitable autofocus operation, such as phase detection autofocus (PDAF).

At block 306, a second arrangement of lens module 176 is determined based on the first arrangement. The second arrangement of lens module 176 may be associated with a fourth zoom level that is less than the second zoom level. For instance, the fourth zoom level may be less than the second zoom level in order to compensate for the additional zoom that the autofocus operation may add. In various aspects, determining the second arrangement includes determining a calibration value associated with the first arrangement. In such aspects, the second arrangement is determined based on the calibration value. The calibration value may be used to adjust optical or digital zoom or both for maintaining a precise field-of-view despite autofocus' zoom adjustment. In an example, the calibration value may be determined from a table of predetermined calibration values. For instance, each calibration value in the table may be associated with an arrangement of lens module 176 or with a zoom level associated with an arrangement. In some aspects, the calibration value is indicative of the arrangement or zoom level itself. Stated differently, the calibration value may indicate that the lens module 176 should be adjusted to the identified arrangement or to an arrangement that achieves the identified zoom level. In other aspects, the calibration value may indicate a value that may be used to determine the arrangement or the zoom level associated with the arrangement. For example, the calibration value may equal 0.98 such that the ISP 112 and/or processor 104 can multiply the second zoom level by 0.98 to obtain the zoom level associated with the arrangement.

In some aspects, determining the calibration value comprises extrapolating (e.g., linearly extrapolating) between a second calibration value associated with a zoom level greater than the user-selected zoom level and a third calibration value associated with a zoom level less than the user selected zoom level. For instance, if the table of predetermined calibration values includes a calibration value corresponding to a 3× zoom level and a 3.5× zoom level, but not a 3.3× zoom level, then a calibration value for the 3.3× zoom level can be determined by extrapolating between the calibration values corresponding to the 3× zoom level and the 3.5× zoom level.

At block 308, the VOZ system 170 is controlled to adjust lens module 176 of VOZ system 170 to a third arrangement associated with the second zoom level based on the second arrangement and the autofocus arrangement of the lens module. In this way, the zoom addition associated with the autofocus operation and the second arrangement's zoom reduction to compensate for the autofocus operation are both taken into account so that lens module 176 is adjusted to precisely achieve the user-selected zoom level. In at least some aspects, adjusting lens module 176 to the third arrangement includes adjusting lens module 176 through the second arrangement to achieve the third arrangement. Stated differently, lens module 176 may be adjusted to the second arrangement so that the autofocus operation adjusts the lens module 176 to the third arrangement. In such aspects, a user may experience the transition to the second arrangement and through the autofocus operation to achieve the third arrangement as a smooth transition (e.g., transitions are not viewed as separate transitions, but rather one smooth transition). The first, second, and third arrangements may each include a position of lens module 176 relative to image sensor 174 and prism 172 of VOZ system 170. In some aspects, the first, second, and third arrangements may each include a position of each of the lenses (e.g., lenses 178, 180, 182) of lens module 176 relative to image sensor 174 and prism 172.

In some aspects, method 300 further includes capturing an image frame, using VOZ system 170, with the lens module 176 in the third arrangement. Stated differently, the image frame is captured at the second zoom level indicated by the user. In some aspects, the capture of the image frame may be initiated by a camera application executing on the processor 104, which causes camera control 210 to activate capture of the image frame by the first camera 103.

In some aspects, method 300 may include determining that the second arrangement is outside of a range of arrangements of lens module 176. For instance, compensating for autofocus at a certain zoom level may require adjusting lens module 176 to an arrangement that VOZ system 170 is physically incapable of achieving. For example, to achieve a second zoom level of 3×, the VOZ system 170 may need to adjust lens module 176 to a second arrangement corresponding to a 2.9× zoom level to compensate for the 0.1× zoom added by autofocus, but the VOZ system 170 can only adjust lens module 176 through a zoom level range of 3× to 5×. As such, VOZ system 170 is physically incapable of adjusting lens module 176 to an arrangement corresponding to a 2.9× zoom level since the 3× is the lowest zoom level VOZ system 170 can achieve with lens module 176. In such aspects, the third arrangement of lens module 176 corresponds to a third zoom level (e.g., 3.1×) greater than the second zoom level based on the autofocus-added zoom.

In these aspects in which VOZ system 170 is physically incapable of achieving the second arrangement, method 300 includes capturing, using VOZ system 170, a first image frame with lens module 176 in the third arrangement. The first image frame may be associated with a zoom level greater than that indicated by the user. In some examples, the first image frame may be received, for example, from a bus coupled to the first camera 103 or from an analog front end (AFE) coupled to the first camera 103. The first image frame may alternatively be received from a wireless camera, in which the image data is received through one or more of the WAN adaptor 152, the LAN adaptor 153, and/or the PAN adaptor 154. The first image frame may alternatively be received from a memory location or a network storage location, such as when the image data was previously captured and is now retrieved from memory 106 and/or a remote location through one or more of the WAN adaptor 152, the LAN adaptor 153, and/or the PAN adaptor 154.

A second image frame may be captured, using an image sensor (e.g., image sensor 101) separate from VOZ system 170, at a fourth zoom level associated with the second arrangement. The fourth zoom level may be less than the second zoom level. In various aspects, the image sensor is a wide-angle image sensor. In some examples, The second image frame may be received, for example, from a bus coupled to the second camera 105 or from an analog front end (AFE) coupled to the second camera 105. The second image frame may alternatively be received from a wireless camera, in which the image data is received through one or more of the WAN adaptor 152, the LAN adaptor 153, and/or the PAN adaptor 154. The second image frame may alternatively be received from a memory location or a network storage location, such as when the image data was previously captured and is now retrieved from memory 106 and/or a remote location through one or more of the WAN adaptor 152, the LAN adaptor 153, and/or the PAN adaptor 154.

A fused image frame is thereafter determined based on the first image frame and second image frame. The fused image represents an image frame that is effectively captured at the second zoom level by VOZ system 170 despite VOZ system 170 being unable to capture an image frame at the second zoom level due to autofocus.

Figure 4:
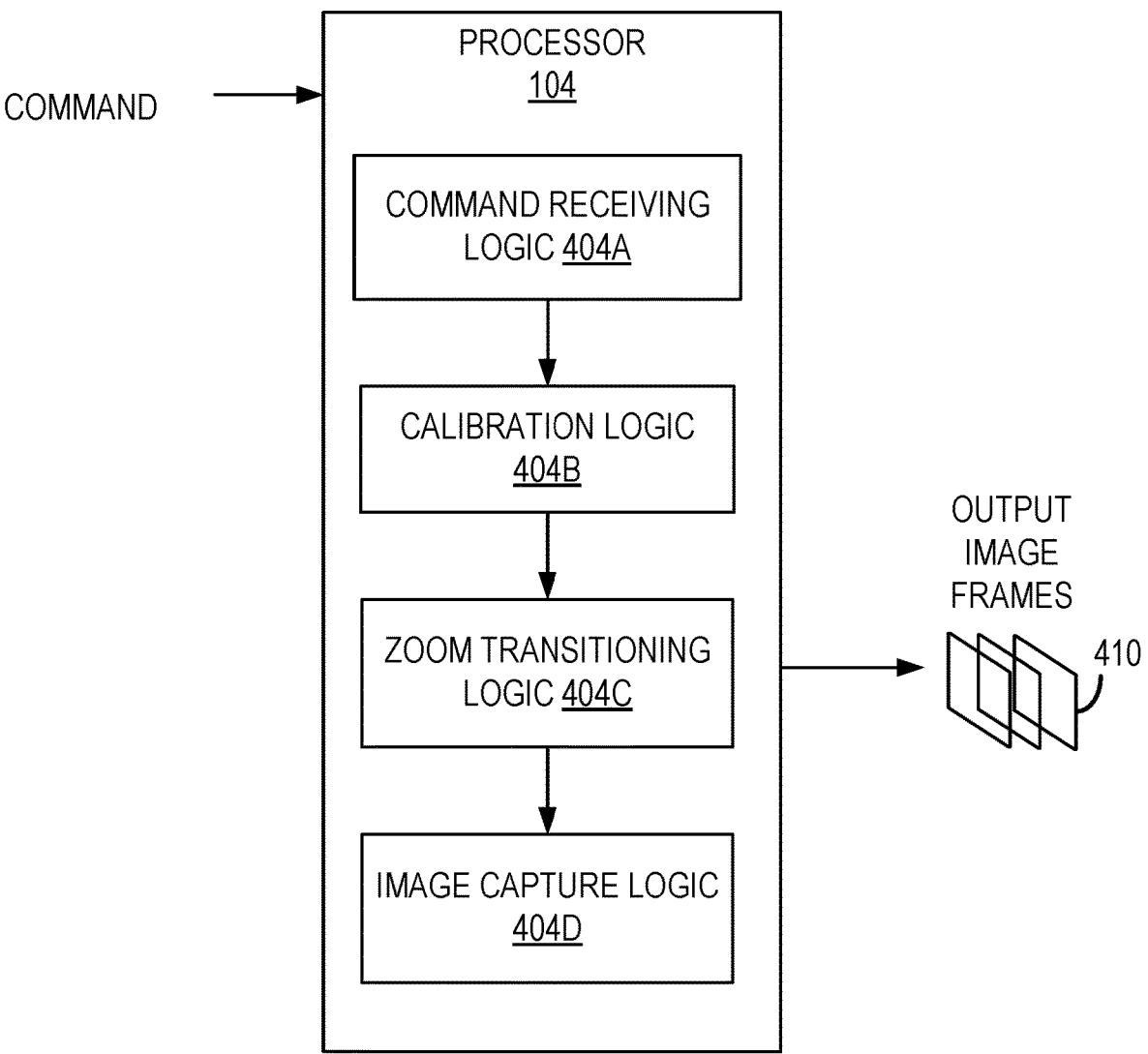
FIG. 4 is a block diagram illustrating an example processor configuration for precise zoom level control in an image capture device according to one or more aspects of the disclosure.

FIG. 4 is a block diagram illustrating an example processor configuration for image data processing in an image capture device according to one or more aspects of the disclosure. The processor 104, or other processing circuitry, may be configured to perform one or more operations of the method of FIG. 3 for precise zoom control. In some aspects, image frames that are captured or received may be processed to determine one or more output image frames 410.

The processor 104 receives a command, such as a command to transition to a new zoom level. In some aspects, the command may be received from a camera application executing on the processor 104. The processor 104 includes command receiving logic 404A, calibration logic 404B, zoom transitioning logic 404C, and image capture logic 404D.

The command receiving logic 404A may be configured to receive a zoom command from a first zoom level to a second zoom level for the VOZ system 170. The zoom command may be received from a user, such as via a camera application 204.

The calibration logic 404B may be configured to determine a first arrangement of lens module 176 of the VOZ system 170 based on a user-indicated zoom level and an autofocus arrangement of the lens module. For example, the first arrangement of lens module 176 may be associated with a zoom level greater than the user-indicated zoom level as a result of an autofocus operation. The calibration logic 404B may be configured to determine a second arrangement of the lens module 176 based on the first arrangement. For example, the second arrangement of the lens module 176 may be associated with a zoom level less than the user-indicated zoom level to compensate for the autofocus operation. In some aspects, determining the second arrangement may include determining a calibration value, which is used to determine the second arrangement. For example, the calibration logic 404B may identify the calibration value in a table of predetermined calibration values corresponding to various zoom levels. The table may be stored in a memory, such as memory 106.

The zoom transitioning logic 404C transitions lens module 176 to a third arrangement associated with the second zoom level based on the second arrangement and the autofocus arrangement of the lens module.

In various aspects, image capture logic 404D may capture one or more image frames with lens module 176 in the third arrangement at the second zoom level. In some examples, image capture logic 404D may output the one or more captured images as image frames 410.

In some aspects, zoom transitioning logic 404C may identify (e.g., based on the calibration value) that the second arrangement is outside of a range within which lens module 176 can be adjusted such that VOZ system 170 is physically incapable of transitioning lens module 176 to the second arrangement. In such aspects, the third arrangement of lens module 176, as a result of the autofocus operation, corresponds to a third zoom level greater than the second zoom level, rather than the second zoom level, because the VOZ system 170 is physically incapable of compensating for the autofocus operation. The image capture logic 404D may capture a first image frame using the VOZ system 170 with lens module 176 in the third arrangement. The image capture logic 404D may also activate the camera 105 to capture a second image frame at the zoom level corresponding to the second arrangement using image sensor 102. Zoom transitioning logic 404C may fuse the first and second image frames to generate output image frames 410 that are representative of image frames captured at the second zoom level. For instance, the image frame captured by image sensor 174 of VOZ system 170 may be captured at a zoom level greater than the second zoom level, the second image frame captured by image sensor 102 of camera 105 may be captured at a zoom level less than the second zoom level, and when the first and second image frames are fused, a fused image frame is determined that represents an image frame captured at the second zoom level which could otherwise not be obtained because of the physical limitations of VOZ system 170 combined with autofocus.

In alternative examples, processor 104 may receive each of the first and second image frames. For example, the first and second image frames may each be retrieved from long-term storage, such as flash storage device or network location, storing a picture that was previously captured or generated.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to receive a zoom command to transition from a first zoom level to a second zoom level for a variable optical zoom (VOZ) system; determine a first arrangement of a lens module of the VOZ system based on the second zoom level and an autofocus arrangement of the lens module; and determine a second arrangement of the lens module based on the first arrangement. The apparatus is further configured to control the VOZ system to adjust the lens module to a third arrangement associated with the second zoom level based on the second arrangement and the autofocus arrangement of the lens module.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the first arrangement of the lens module is associated with a third zoom level that is greater than the second zoom level.

In a third aspect, in combination with one or more of the first aspect or the second aspect, the second arrangement of the lens module is associated with a fourth zoom level that is less than the second zoom level.

In a fourth aspect, in combination with one or more of the first aspect through the third aspect, the first zoom level is greater than the second zoom level.

In a fifth aspect, in combination with one or more of the first aspect through the fourth aspect, the second zoom level is greater than the first zoom level.

In a sixth aspect, in combination with one or more of the first aspect through the fifth aspect, determining the second arrangement includes determining a calibration value associated with the first arrangement, and the second arrangement is determined based on the calibration value.

In a seventh aspect, in combination with one or more of the first aspect through the sixth aspect, the apparatus is further configured to determine that the second arrangement is outside of a range of arrangements of the lens module. The third arrangement corresponds to a third zoom level greater than the second zoom level. The apparatus is further configured to capture, using the VOZ system, a first image frame with the lens module in the third arrangement; capture, using an image sensor separate from the VOZ system, a second image frame at a fourth zoom level associated with the second arrangement; and determine a fused image frame based on the first and second image frames.

In an eighth aspect, in combination with the seventh aspect, the VOZ system is physically incapable of capturing an image frame at a zoom level less than the second zoom level.

In a ninth aspect, in combination with one or more of the seventh aspect through the eighth aspect, the fourth zoom level is less than the second zoom level.

In a tenth aspect, in combination with one or more of the seventh aspect through the ninth aspect, the image sensor is a wide-angle image sensor.

In an eleventh aspect, in combination with one or more of the second aspect through the tenth aspect, an image capture device comprises a variable optical zoom (VOZ) system comprising a lens module; a memory storing processor-readable code; and at least one processor coupled to the memory and to the image sensor, the at least one processor configured to execute the processor-readable code to cause the at least one processor to perform operations. The operations include receiving a zoom command to transition from a first zoom level to a second zoom level for the VOZ system; determining a first arrangement of the lens module of the VOZ system based on the second zoom level and an autofocus arrangement of the lens module; and determining a second arrangement of the lens module based on the first arrangement. The operations further include controlling the VOZ system to adjust the lens module to a third arrangement associated with the second zoom level based on the second arrangement and the autofocus arrangement of the lens module.

In a twelfth aspect, in combination with the eleventh aspect, the first arrangement of the lens module is associated with a third zoom level that is greater than the second zoom level, and the second arrangement of the lens module is associated with a fourth zoom level that is less than the second zoom level.

In a thirteenth aspect, in combination with one or more of the eleventh aspect through the twelfth aspect, determining the second arrangement includes determining a calibration value associated with the first arrangement, and the second arrangement is determined based on the calibration value.

In a fourteenth aspect, in combination with one or more of the eleventh aspect through the thirteenth aspect, the image capture device further comprises an image sensor separate from the VOZ system. In the fourteenth aspect, the operations further comprise: determining that the second arrangement is outside of a range of arrangements of the lens module. The third arrangement corresponds to a third zoom level greater than the second zoom level. The operations further comprise capturing, using the VOZ system, a first image frame with the lens module in the third arrangement; capturing, using the image sensor, a second image frame at a fourth zoom level associated with the second arrangement; and determining a fused image frame based on the first and second image frames.

In a fifteenth aspect, in combination with the fourteenth aspect, the image sensor is a wide-angle image sensor.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame," "modified image frame," and "corrected image frame" may refer to an image frame that has been processed by any of the disclosed techniques to adjust raw image data received from an image sensor. Further, aspects of the disclosed techniques may be implemented for processing image data received from image sensors of the same or different capabilities and characteristics (such as resolution, shutter speed, or sensor type). Further, aspects of the disclosed techniques may be implemented in devices for processing image data, whether or not the device includes or is coupled to image sensors. For example, the disclosed techniques may include operations performed by processing devices in a cloud computing system that retrieve image data for processing that was previously recorded by a separate device having image sensors.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 3-5 may be combined with one or more blocks (or operations) described with reference to another of the figures. For example, one or more blocks (or operations) of FIG. 3 or 4 may be combined with one or more blocks (or operations) of FIGS. 1-2. As another example, one or more blocks associated with FIG. 5 may be combined with one or more blocks (or operations) associated with FIGS. 1-2.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:

receiving a zoom command to transition from a first zoom level to a second zoom level for a variable optical zoom (VOZ) system;

determining, prior to execution of the zoom command, a first arrangement of a lens module of the VOZ system based on the second zoom level and an autofocus arrangement of the lens module;

determining, prior to execution of the zoom command, a second arrangement of the lens module based on the first arrangement; and controlling the VOZ system to execute the zoom command by adjusting the lens module to a third arrangement associated with the second zoom level based on the second arrangement and the autofocus arrangement of the lens module.

2. The method of claim 1, wherein the first arrangement of the lens module is associated with a third zoom level that is greater than the second zoom level.

3. The method of claim 1, wherein the second arrangement of the lens module is associated with a fourth zoom level that is less than the second zoom level.

4. The method of claim 1, wherein the first zoom level is greater than the second zoom level.

5. The method of claim 1, wherein the second zoom level is greater than the first zoom level.

6. The method of claim 1, wherein determining the second arrangement includes determining a calibration value associated with the first arrangement, and wherein the second arrangement is determined based on the calibration value.

7. The method of claim 1, further comprising:

determining that the second arrangement is outside of a range of arrangements of the lens module, wherein the third arrangement corresponds to a third zoom level greater than the second zoom level;

capturing, using the VOZ system, a first image frame with the lens module in the third arrangement;

capturing, using an image sensor separate from the VOZ system, a second image frame at a fourth zoom level associated with the second arrangement; and determining a fused image frame based on the first and second image frames.

8. The method of claim 7, wherein the VOZ system is physically incapable of capturing an image frame at a zoom level less than the second zoom level.

9. The method of claim 7, wherein the fourth zoom level is less than the second zoom level.

10. The method of claim 7, wherein the image sensor is a wide-angle image sensor.

11. An apparatus, comprising:

a memory storing processor-readable code; and at least one processor coupled to the memory, the at least one processor configured to execute the processor-readable code to cause the at least one processor to perform operations including:

receiving a zoom command to transition from a first zoom level to a second zoom level for a variable optical zoom (VOZ) system;

determining, prior to execution of the zoom command, a first arrangement of a lens module of the VOZ system based on the second zoom level and an autofocus arrangement of the lens module;

determining, prior to execution of the zoom command, a second arrangement of the lens module based on the first arrangement; and controlling the VOZ system to execute the zoom command by adjusting the lens module to a third arrangement associated with the second zoom level based on the second arrangement and the autofocus arrangement of the lens module.

12. The apparatus of claim 11, wherein the first arrangement of the lens module is associated with a third zoom level that is greater than the second zoom level.

13. The apparatus of claim 11, wherein the second arrangement of the lens module is associated with a fourth zoom level that is less than the second zoom level.

14. The apparatus of claim 11, wherein the first zoom level is greater than the second zoom level.

15. The apparatus of claim 11, wherein the second zoom level is greater than the first zoom level.

16. The apparatus of claim 11, wherein determining the second arrangement includes determining a calibration value associated with the first arrangement, and wherein the second arrangement is determined based on the calibration value.

17. The apparatus of claim 11, wherein the operations further include:

determining that the second arrangement is outside of a range of arrangements of the lens module, wherein the third arrangement corresponds to a third zoom level greater than the second zoom level;

capturing, using the VOZ system, a first image frame with the lens module in the third arrangement;

capturing, using an image sensor separate from the VOZ system, a second image frame at a fourth zoom level associated with the second arrangement; and determining a fused image frame based on the first and second image frames.

18. The apparatus of claim 17, wherein the VOZ system is physically incapable of capturing an image frame at a zoom level less than the second zoom level.

19. The apparatus of claim 17, wherein the fourth zoom level is less than the second zoom level.

20. The apparatus of claim 17, wherein the image sensor is a wide-angle image sensor.

21. A non-transitory computer-readable medium storing instructions that, when executed by a processor, cause the processor to perform operations comprising:

receiving a zoom command to transition from a first zoom level to a second zoom level for a variable optical zoom (VOZ) system;

determining, prior to execution of the zoom command, a first arrangement of a lens module of the VOZ system based on the second zoom level and an autofocus arrangement of the lens module;

determining, prior to execution of the zoom command, a second arrangement of the lens module based on the first arrangement; and controlling the VOZ system to execute the zoom command by adjusting the lens module to a third arrangement associated with the second zoom level based on the second arrangement and the autofocus arrangement of the lens module.

22. The non-transitory, computer-readable medium of claim 21, wherein the first arrangement of the lens module is associated with a third zoom level that is greater than the second zoom level, and wherein the second arrangement of the lens module is associated with a fourth zoom level that is less than the second zoom level.

23. The non-transitory, computer-readable medium of claim 21, wherein the first zoom level is greater than the second zoom level.

24. The non-transitory, computer-readable medium of claim 21, wherein the second zoom level is greater than the first zoom level.

25. The non-transitory, computer-readable medium of claim 21, wherein the operations further comprise:

determining that the second arrangement is outside of a range of arrangements of the lens module, wherein the third arrangement corresponds to a third zoom level greater than the second zoom level;

capturing, using the VOZ system, a first image frame with the lens module in the third arrangement;

capturing, using an image sensor separate from the VOZ system, a second image frame at a fourth zoom level associated with the second arrangement; and determining a fused image frame based on the first and second image frames.

26. An image capture device, comprising:

a variable optical zoom (VOZ) system comprising a lens module;

a memory storing processor-readable code; and at least one processor coupled to the memory and to the VOZ system, the at least one processor configured to execute the processor-readable code to cause the at least one processor to perform operations comprising:

receiving a zoom command to transition from a first zoom level to a second zoom level for the VOZ system;

determining, prior to execution of the zoom command, a first arrangement of the lens module of the VOZ system based on the second zoom level and an autofocus arrangement of the lens module;

determining, prior to execution of the zoom command, a second arrangement of the lens module based on the first arrangement; and controlling the VOZ system to execute the zoom command by adjusting the lens module to a third arrangement associated with the second zoom level based on the second arrangement and the autofocus arrangement of the lens module.

27. The image capture device of claim 26, wherein the first arrangement of the lens module is associated with a third zoom level that is greater than the second zoom level, and wherein the second arrangement of the lens module is associated with a fourth zoom level that is less than the second zoom level.

28. The image capture device of claim 26, wherein determining the second arrangement includes determining a calibration value associated with the first arrangement, and wherein the second arrangement is determined based on the calibration value.

29. The image capture device of claim 26, further comprising an image sensor separate from the VOZ system, wherein the operations further comprise:

determining that the second arrangement is outside of a range of arrangements of the lens module, wherein the third arrangement corresponds to a third zoom level greater than the second zoom level;

capturing, using the VOZ system, a first image frame with the lens module in the third arrangement;

capturing, using the image sensor, a second image frame at a fourth zoom level associated with the second arrangement; and determining a fused image frame based on the first and second image frames.

30. The image capture device of claim 26, wherein the image sensor is a wide-angle image sensor.

* * * * *